Aug. 14, 1951    E. E. WHITE    2,563,894
MECHANICALLY OPERATED GATE
Filed Dec. 5, 1945    2 Sheets-Sheet 1

ELLIS E. WHITE,
INVENTOR.

BY *W E Beatty*

ATTORNEY.

Aug. 14, 1951     E. E. WHITE     2,563,894
MECHANICALLY OPERATED GATE
Filed Dec. 5, 1945     2 Sheets-Sheet 2
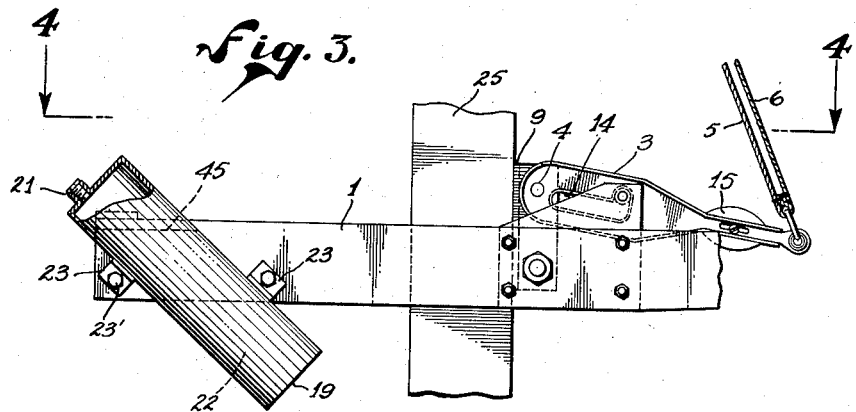
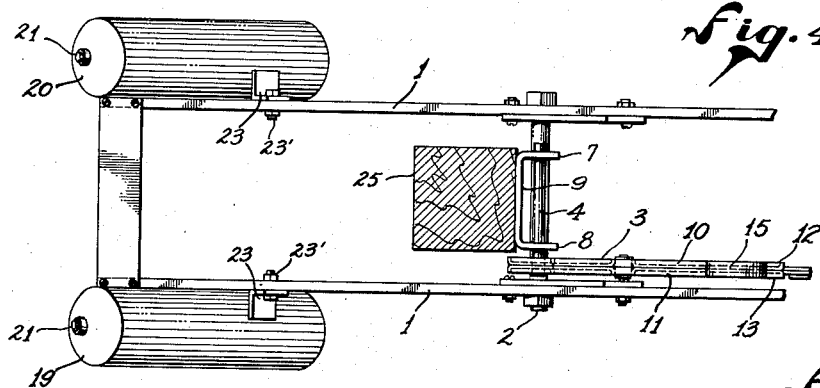
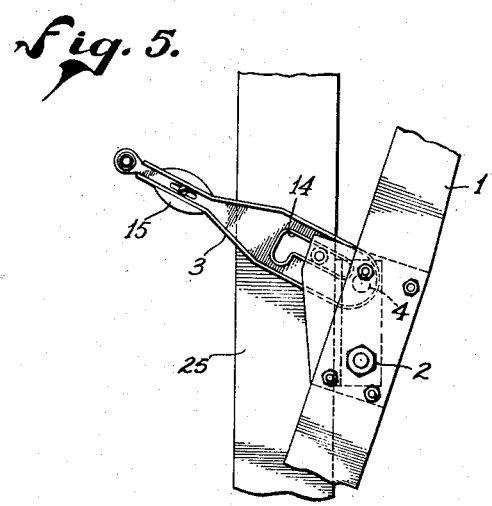
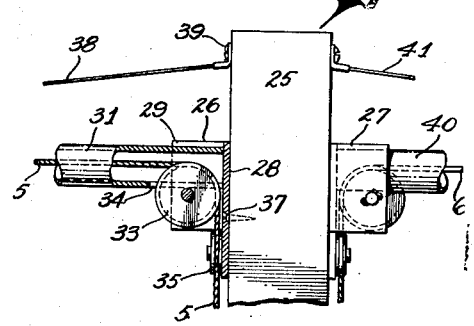
ELLIS E. WHITE,
INVENTOR.
BY
ATTORNEY.

Patented Aug. 14, 1951

2,563,894

UNITED STATES PATENT OFFICE 2,563,894

MECHANICALLY OPERATED GATE

Ellis E. White, Beverly Hills, Calif., assignor, by mesne assignments, to A. Kremser and J. R. MacGregor Application December 5, 1945, Serial No. 632,944

2 Claims. (Cl. 39—44)

The invention relates to a mechanically operated gate and more particularly to improvements in the gate disclosed and claimed in U. S. Patent 1,910,220, issued May 23, 1933 to Kremser, et al.

In the patent, when the gate is moved from its closed position to its open position, the pull cord and the cam lever are in alignment and therefore at dead center when the cam lever is vertical, the gate then extending at an angle of 45°. The gate has a counterbalance, and the momentum of the gate is relied upon to carry it past the above-mentioned dead center. Unless the gate is moved towards open position with a sufficient speed, and this may be considerable if a wind is blowing in a direction to close the gate, the gate will move from its 45° angle towards closed position instead of towards its open position. In this case, the pull cord must again be operated and with increased force.

An object of the invention is to overcome this defect. This is done by employing a shifting counter weight having a moment or torque which progressively increases for very slight movement of the gate towards the vertical from its 45° position. Preferably the counterweight is so arranged that it is unbalanced in a direction to open the gate, at a time when the pull cord and cam lever are at dead center. In the preferred form, this counter weight comprises a liquid container to be partially filled with a liquid such as oil by the user, the container being secured on the gate in either a horizontal or a slightly tilted position, when the gate extends at 45°. The advantage of this arrangement is that in shipping the gate to the user, the shipping weight is very much lower than in the case of the patented structure, as the fluid containers can be shipped empty, to be filled when the gate is installed.

Another object of the invention is to avoid the necessity for two auxiliary posts to support the pull cords. This is accomplished by providing a bracket which may be a metal stamping having a laterally extending hollow arm secured thereto, with pulleys at the opposite ends of the arm and with guide rollers on the bracket for guiding the pull cord through the inside of the hollow arm.

Another object of the invention is to improve the manufacture and operation of the cam lever. The manufacture is improved through the use of metal stampings welded together and having outturned peripheral flanges which strengthen the structure. The operation of the cam lever is improved by adding to it an adjustable weight member on the outer end of the lever whereby it more positively retracts the pull cord when the cord is released.

For further details of the invention reference may be made to the drawings wherein Fig. 1 is a perspective view of a mechanically operated gate according to the present invention.

Fig. 3 is an enlarged view in side elevation with parts broken away of the gate mechanism with the gate closed.

Fig. 4 is a plan view on line 4—4 of Fig. 3 looking in the direction of the arrows.

Fig. 5 is an enlarged view in side elevation with parts broken away of the gate mechanism with the gate fully opened.

Fig. 6 is an enlarged view with parts broken away on line 6—6 in Fig. 2 looking in the direction of the arrows.

Figure 1:
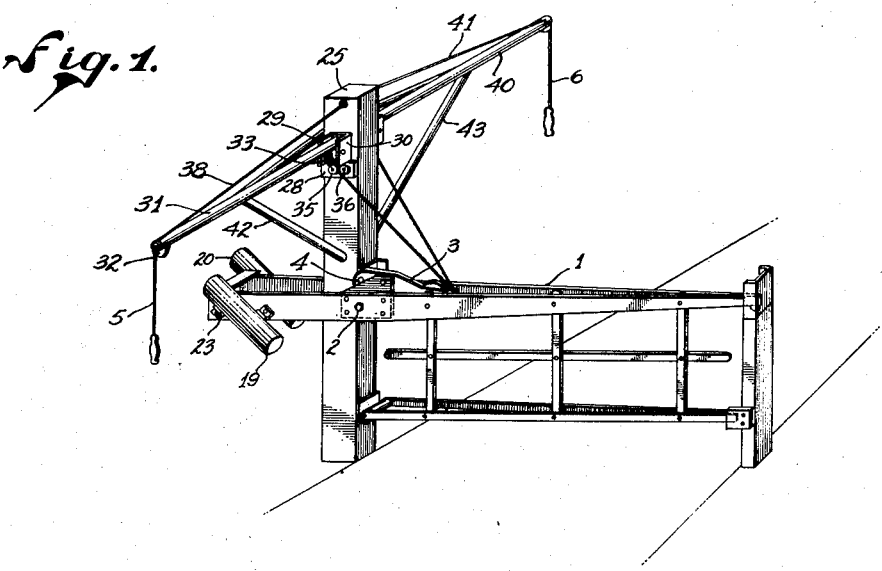

Referring in detail to the drawings, the gate 1 is hinged on a bearing 2 to open vertically under control of a cam lever 3 hinged on a bearing 4 and operated by pull cords 5 and 6. The gate 1 is self-locking for reasons explained in the patent.

An improved support for the bearings 2 and 4 is provided by mounting them in the oppositely extending flanges 7 and 8 on a bracket 9 which may be a metal stamping.

As shown in Figs. 3 and 4, the cam lever 3 may also be made of metal stampings 10 and 11 which are welded back to back, each of the stampings having an out-turned flange 12 and 13 around the periphery of the cam to strengthen it. The inner end of the cam lever 3 has a cam slot 14 which extends through both of the stampings 10 and 11, and the other end of the lever has secured thereto an adjustable weight member 15. The weight 15 acts through a lever arm which is almost as long as the cam lever itself and it assures that the cam lever will fall to one side or the other of its hinge 4 when the pull cord 5 or 6 is released.

Figure 2:
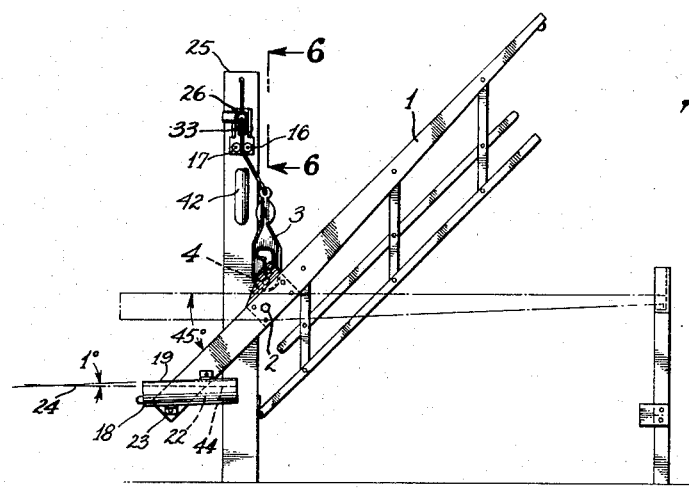
Fig. 2 is a side view in elevation of the gate in Fig. 1, with the gate extending at 45°.

When the gate is closed the cam lever 3 is in the position shown in Fig. 3 and on pulling either of the cords 5 or 6 the cam lever 3 is pulled not only to a vertical position as shown in Fig. 2, but in fact slightly beyond the vertical position, as the guide pulleys 16 and 17 shown in Fig. 2 are behind a vertical line through the cam hinge 4.

The shifting counterweight 18 is in the form of two hollow fluid containers 19 and 20, each having a suitable closure such as indicated at 21. The containers 19 and 20 are partially filled with liquid as indicated at 22 in Fig. 2, the containers being secured by brackets 23 and bolts 23' to the gate on the rear end or extension of the gate at the opposite side of the hinge 2 from the barrier or main portion of the gate. The containers 19, 20 provide runways for the shifting weight of the liquid. The containers 19 and 20 are secured to the gate in such position that the containers at their left end as seen in Fig. 2 tilt down by a slight angle such as 1° as indicated at 24, the liquid level extending lengthwise of the containers as indicated by the broken line 44. In that position, the weight of the fluid 22 is such as to slightly over-balance the gate 1 and tend to move it towards open position. As the gate 1 continues to move open from its 45° position, the center of gravity of fluid 22 shifts from a comparatively short lever arm about hinge 2 to a longer lever arm towards the outer end of the containers, thereby increasing the moment or torque of the counter balancing fluid 22. When the cam lever 3 moves counterclockwise beyond its vertical position shown in Fig. 2, during continued opening movement of the gate, the weight member 15 assures that the cam lever will drop to its idle position shown in Fig. 5, where it extends at a large angle, in position to be moved clockwise and close the gate when the cords 5 and 6 are pulled for that purpose. During the closing movement of the gate, after the cam lever 3 passes its vertical position, the weight 15 assures that the cam lever 3 will drop to its alternate position shown in Fig. 3. Also during the closing movement of the gate the liquid counterweight 22 shifts from the outer ends towards the inner ends of the containers 19 and 20, that is from a larger moment or torque to a smaller moment or torque, to accelerate the closing of the gate. As shown in Fig. 3, when the gate is closed, the liquid 22 fills the inner ends of the containers, the outer ends being empty, and the liquid level being indicated by the broken line 45.

The auxiliary posts for the pull cords as in the patent are avoided according to the present construction by employing at each side of the main post 25 a bracket 26 as shown in Figs. 1, 2 and 6, Fig. 6 also showing a similar bracket 27 for the pull cord 6 at the other side of the post. As both brackets 26 and 27 are alike, only bracket 26 will be described. Bracket 26 has a flat body portion 28 from the upper portion of which are bent out at right angles, two parallel spaced flanges 29 and 30. Secured to the bracket 26 between the flanges 29 and 30 is the inner end of a hollow tubular arm 31 through the inside of which extends the pull cord 5. Cord 5 is guided by a pulley 32 which extends into and is journaled in the outer end of the tubular arm 31. Journaled between the flanges 29 and 30 is a companion pulley 33 (see Fig. 6) which extends through a slot 34 in the underside of the inner end of the hollow arm 31. On the face of the bracket body 28 are a pair of guide rollers 35 and 36 (see Fig. 1), at each side of pulley 33. Cord 5 passes between guide pulleys 35, 36 to pulley 33. Guide pulleys 35, 36 are approximately in the vertical plane in which cam lever 3 swings and they guide cord 5 to and from pulley 33 while cam lever 3 swings from one side of post 25 to the other. Brackets 26 and 27 may be metal stampings and they are secured to the opposite flat sides of the post 25 by suitable means such as screws indicated at 37 in Fig. 6. The outer end of hollow arm 31 may be braced by a wire 38 or the like suitably secured at one end to the outer end of hollow arm 31 and secured at its other end to the post 25 as indicated at 39. The other hollow arm 40 is similarly mounted in bracket 27 and supported by a brace 41. The hollow arms 31 and 40 may also be braced by struts as indicated at 42 and 43 in Fig. 1.

Various modifications may be made in the invention without departing from the spirit of the following claims.

I claim:

1. In a mechanically operated gate hinged to open vertically, the combination comprising a post, a gate including barrier and extension portions disposed at opposite sides of hinge means supported by said post, cam follower support means projecting from said barrier portion, a cam follower mounted on said support means, a cam lever hingedly supported by said post and cooperating with said cam follower to positively open said gate to an angle of 45° when said cam lever is raised to a vertical position, a weight member positioned adjacent the outer end of said cam lever to provide an unstable position for said lever when in said vertical position, mechanical operating means for said cam lever adapted to elevate said lever to said vertical position and to throw said lever beyond said vertical position, and counter weight means for said extension portion comprising an elongated container partially filled with liquid and means securing said container adjacent the outer end of said extension portion in a position so that the end of said container nearest said post is inclined slightly above the horizontal when said gate is positively raised to an angle of 45° whereby the turning moment of said counterweight means progressively increases compared to the turning moment of said barrier portion and said gate is thereby biased to its open position.

2. In a mechanically operated gate hinged to open vertically in accordance with claim 1 in which the position of said weight member is adjustable with respect to the outer end of said cam lever.

ELLIS E. WHITE.

REFERENCES CITED

The following references are of record in the file of this patent:

UNITED STATES PATENTS

| Number | Name | Date |
|---|---|---|
| 21,645 | Allington | Oct. 5, 1858 |
| 218,801 | Williams | Aug. 19, 1879 |
| 798,846 | Van Pelt | Sept. 5, 1905 |
| 1,194,897 | Still | Aug. 15, 1916 |
| 1,517,316 | Rodgers | Dec. 2, 1924 |
| 1,910,220 | Kremser et al. | May 23, 1933 |
| 2,293,462 | Haynes | Aug. 18, 1942 |
| 2,345,822 | Leake | Apr. 4, 1944 |
| 2,371,036 | Elwert | Mar. 6, 1945 |